(12) United States Patent  
Kim et al.

(10) Patent No.: US 10,503,324 B2  
(45) Date of Patent: Dec. 10, 2019

(54) TOUCH SCREEN PANEL HAVING WIRING INCLUDING EXTENSION

(71) Applicant: Samsung Display Co., Ltd., Yongin-si (KR)

(72) Inventors: In Cheol Kim, Goyang-si (KR); Il Ho Lee, Asan-si (KR); Byoung Won Choi, Asan-si (KR); Jin Woo Park, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/837,528

(22) Filed: Aug. 27, 2015

(65) Prior Publication Data

US 2016/0209965 A1 Jul. 21, 2016

(30) Foreign Application Priority Data

Jan. 20, 2015 (KR) .......................... 10-2015-0009411

(51) Int. Cl.
*G06F 3/044* (2006.01)

(52) U.S. Cl.
CPC ..................... *G06F 3/044* (2013.01)

(58) Field of Classification Search
None
See application file for complete search history.

(56) References Cited

U.S. PATENT DOCUMENTS

| | | | |
|---|---|---|---|
| 2008/0074137 A1* | 3/2008 | Kim | G02F 1/13458 324/750.3 |
| 2011/0234932 A1* | 9/2011 | Jung | G02F 1/13452 349/40 |
| 2013/0279063 A1 | 10/2013 | Yoo et al. | |
| 2014/0055412 A1 | 2/2014 | Teramoto | |
| 2014/0145977 A1* | 5/2014 | Kang | G06F 3/044 345/173 |
| 2014/0152910 A1* | 6/2014 | Kang | G06F 1/1643 349/12 |
| 2014/0168109 A1* | 6/2014 | Kang | G06F 3/044 345/173 |
| 2014/0204286 A1* | 7/2014 | Park | G06F 1/1626 349/12 |
| 2014/0232691 A1 | 8/2014 | Lee | |
| 2014/0247403 A1* | 9/2014 | Mun | G02F 1/13338 349/12 |

(Continued)

FOREIGN PATENT DOCUMENTS

KR 10-2013-0009466 1/2013
KR 10-2013-0035243 4/2013

(Continued)

*Primary Examiner* — David D Davis
(74) *Attorney, Agent, or Firm* — H.C. Park & Associates, PLC

(57) ABSTRACT

A touch screen panel includes a substrate including an effective area and an opaque layer disposed outside the effective area, sensing electrodes disposed in the effective area, pads disposed on the opaque layer, and wirings connecting the sensing electrodes to the pads, respectively, in which the wirings each have different lengths, and a first wiring having the shortest length among the wirings includes an extension, the extension covering a side of the opaque layer.

16 Claims, 9 Drawing Sheets

(56) References Cited

U.S. PATENT DOCUMENTS

| | | | | |
|---|---|---|---|---|
| 2014/0252322 A1* | 9/2014 | Kim | ...................... | H01L 27/323 257/40 |
| 2014/0267953 A1* | 9/2014 | Kim | ........................ | G06F 3/044 349/12 |
| 2014/0285728 A1* | 9/2014 | Lee | ........................ | G06F 3/041 349/12 |
| 2014/0340595 A1* | 11/2014 | Kim | ........................ | G06F 3/044 349/12 |
| 2014/0340596 A1* | 11/2014 | Kim | ........................ | G06F 3/044 349/12 |

FOREIGN PATENT DOCUMENTS

| | | |
|---|---|---|
| KR | 10-1248813 | 4/2013 |
| KR | 10-2013-0111022 | 10/2013 |
| KR | 10-2013-0118179 | 10/2013 |
| KR | 10-2014-0019146 | 2/2014 |
| KR | 10-2014-0027882 | 3/2014 |

\* cited by examiner

TOUCH SCREEN PANEL HAVING WIRING INCLUDING EXTENSION

CROSS-REFERENCE TO RELATED APPLICATION

This application claims priority from and the benefit of Korean Patent Application No. 10-2015-0009411, filed on Jan. 20, 2015, which is hereby incorporated by reference for all purposes as if fully set forth herein.

BACKGROUND

Field

Exemplary embodiments of the present invention relate to a touch screen panel, and more particularly, to a touch screen panel capable of suppressing damage from static electricity.

Discussion of the Background

A touch screen panel of a display device may provide a touch sensing function that allows a viewer to interact with the display device. The touch sensing function may determine touch information of whether a touch exists, a touch position, and the like, when the viewer approaches or contacts the surface of the display device by using a finger, a touch pen, or the like. The display device may receive an image signal based on the touch information to display an image.

A capacitive type touch screen panel may detect a change in capacitance of a sensing capacitor, when a conductor such as a finger approaches the touch screen panel, to determine the touch information. The touch screen panel may be formed in a separate process from a display panel and then assembled on the display panel (external type) or formed integrally with the display panel (internal type).

A self-capacitance type touch screen panel of the capacitive types may include sensing electrodes disposed on each pixel for touch recognition and wirings connecting the sensing electrodes with a pad portion. The sensing electrode and the wiring may include a transparent conductive layer. However, since the touch screen panel may be vulnerable to static electricity, the wiring may be disconnected due to the static electricity.

The above information disclosed in this Background section is only for enhancement of understanding of the background of the background of the inventive concept, and, therefore, it may contain information that does not form the prior art that is already known in this country to a person of ordinary skill in the art.

SUMMARY

Exemplary embodiments of the present invention provide a touch screen panel capable of enhancing durability by suppressing damage from static electricity.

Additional aspects will be set forth in the detailed description which follows, and, in part, will be apparent from the disclosure, or may be learned by practice of the inventive concept.

According to an exemplary embodiment of the present invention, a touch screen panel includes a substrate including an effective area and an opaque layer disposed outside the effective area, sensing electrodes disposed in the effective area, pads disposed on the opaque layer, and wirings connecting the sensing electrodes and the pads, respectively, in which the wirings each have different lengths, and a first wiring having the shortest length among the wirings includes an extension, the extension covering a side of the opaque layer.

At least two wirings including the first wiring may include the extension, and the extension may include a length greater than a length of the side of the opaque layer.

The extension may include a width substantially the same as a width of each pad, and the extension may be connected to a corresponding wiring via oblique portions disposed at each side of the extension.

The extension may include two conductive paths separated by a slit, and each of the two conductive paths may include a width substantially the same as a width of a corresponding wiring of the wirings.

A sensing electrode contacting the first may extend to the side of the opaque layer, and the at least two wirings each include slits.

Among the at least two wirings, a total area of the slits is greater for a wiring having a shorter length.

The extension includes an extended portion of a sensing electrode of the sensing electrodes contacting the first wiring along the side of the opaque layer.

The substrate may be a cover window, and the opaque layer may be a printed layer.

According to an exemplary embodiment of the present invention, a touch screen panel includes a substrate including an effective area and a pad area, sensing electrodes disposed in the effective area, pads disposed in the pad area, and wirings connecting the sensing electrodes and the pads, respectively, in which the wirings each have different lengths, and at least two wirings including a shortest wiring among the wirings include slits.

Among the at least two wirings, a total area of the slits may be greater for a wiring having a shorter length.

According to an exemplary embodiment of the present invention, a substrate includes an effective area and a pad area, sensing electrodes disposed in the effective area, pads disposed in the pad area, wirings connecting the sensing electrodes and the pads, respectively, the wirings each having different lengths, and an electrostatic dispersion pad disposed adjacent to a sensing electrode disposed closest to the pad area among the sensing electrodes.

The electrostatic dispersion pad may be disposed adjacent to a first wiring, the first wiring having the shortest length among the wirings.

The electrostatic dispersion pad may include a first pad portion disposed in parallel to the first wiring, a second pad portion connected to the first pad portion and disposed in parallel to the wirings between the wirings in the effective area, and third pad portions connected to the second pad portion and disposed between the sensing electrodes disposed in one direction among the sensing electrodes, respectively.

The electrostatic dispersion pad may be configured to be grounded or receive DC voltage.

The substrate may further include an opaque layer disposed outside the effective area, and the pads may be formed on the opaque layer.

According to an exemplary embodiment of the present invention, at least one wiring includes an extension covering the side of the opaque layer. As such, when static electricity flows into the wiring, the static electricity may not be concentrated at a portion where the wiring is curved. Accordingly, it may be possible to suppress the damage to the wiring due to the static electricity.

According to an exemplary embodiment of the present invention, a large number of slits is formed in the wirings having small lengths to increase line resistance. Accordingly, static electricity may not easily flow into the wiring. Accordingly, it may be possible to suppress the damage to the wiring due to the static electricity.

According to an exemplary embodiment of the present invention, the touch screen panel includes an electrostatic dispersion pad disposed adjacent to the sensing electrodes. Accordingly, static electricity flows to the electrostatic dispersion pad instead of the wirings, which may be grounded. Accordingly, it may be possible to suppress damage to the wiring due to the static electricity.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
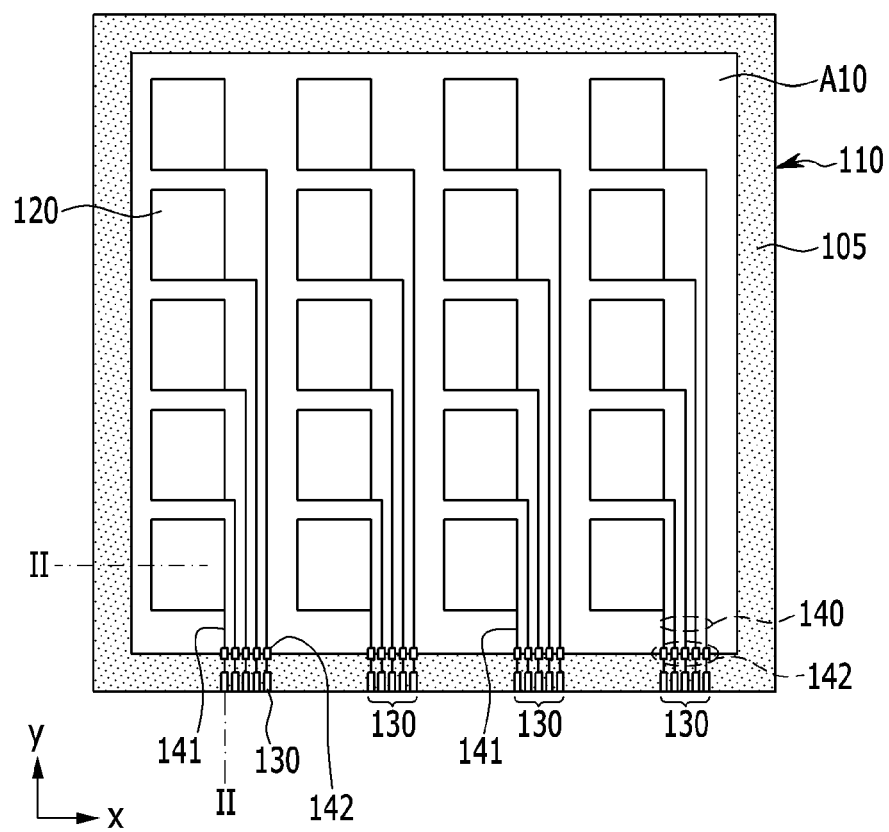
FIG. 1 is a plan view illustrating a touch screen panel according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
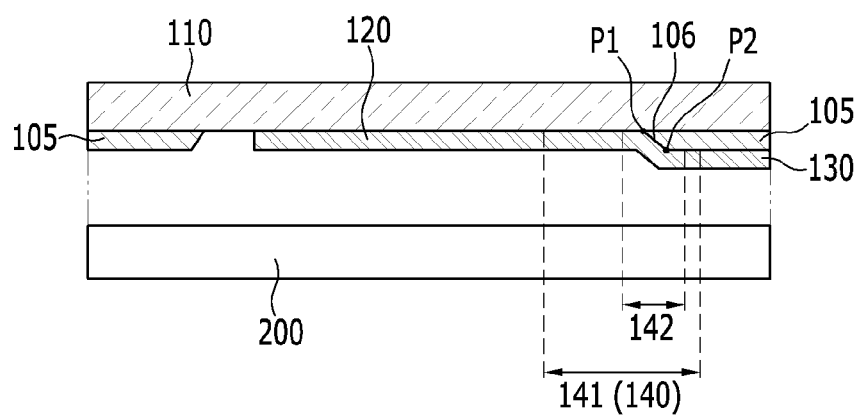
FIG. 2 is a cross-sectional view of the touch screen panel of FIG. 1 taken along line II-II.
Figure 3:
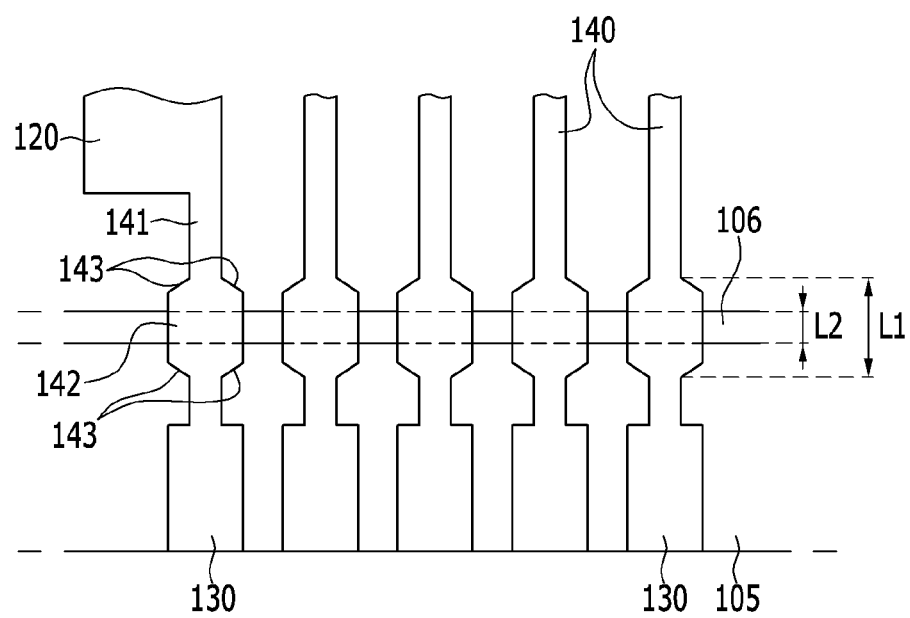
FIG. 3 is a partially enlarged view of FIG. 1.

FIG. 1 is a plan view illustrating a touch screen panel according to an exemplary embodiment of the present invention, FIG. 2 is a cross-sectional view of the touch screen panel of FIG. 1 taken along line II-II, and FIG. 3 is a partially enlarged view of FIG. 1.

Referring to FIGS. 1 to 3, a touch screen panel 100 of the present exemplary embodiment includes a substrate 110, an opaque layer 105 disposed along an edge of the substrate 110, sensing electrodes 120, pads 130, and wirings 140, which are formed on the substrate 110.

The substrate 110 may be a cover window covering and protecting a display panel, and the opaque layer 105 may be a printed layer formed along the edge of the cover window. The printed layer may be a black layer. The touch screen panel 100 formed on the cover window may be an external type, in which the touch screen panel 100 is prepared in a separate process from the display panel and then assembled on the display panel.

Alternatively, the touch screen panel 100 may be an internal type, in which the touch screen panel 100 is integrally prepared with the display panel. More particularly, the substrate 110 may form the display panel, and the opaque layer 105 may be layers formed in a non-display area of the display panel, such as a protective layer.

In a liquid crystal display according to an exemplary embodiment of the present invention, the display panel includes a first substrate on which thin-film transistors and pixel electrodes are formed, and a second substrate on which a color filter and a common electrode are formed. The sensing electrodes 120 may be formed on an inner surface of the first substrate or an inner surface of the second substrate (in-cell type), or formed on an outer surface of the second substrate (on-cell type).

In an organic light emitting diode display according to an exemplary embodiment of the present invention, the display panel includes a first substrate on which pixel circuits and organic light emitting diodes are formed, and an encapsulation substrate or a thin film encapsulation layer encapsulating the organic light emitting diodes. The sensing electrodes 120 may be formed on an inner surface of the first substrate or an inner surface of the thin film encapsulation layer (in-cell type), or formed on an outer surface of the encapsulation substrate or the thin film encapsulation layer (on-cell type).

In FIG. 2, an external type touch screen panel including the sensing electrodes 120 on the cover window is illustrated. In FIG. 2, reference numeral 200 represents the display panel.

The substrate 110 includes an effective area A10 on which the sensing electrodes 120 are to be formed. The opaque layer 105 is formed outside the effective area A10 and has a predetermined thickness. The opaque layer 105 includes a side 106 facing the effective area A10, and the side 106 may be vertical to a surface of the substrate 110 or have an inclined surface as illustrated in FIG. 2.

The sensing electrodes 120 are formed in the effective area A10 of the substrate 110 and may be disposed to correspond to each basic pixel for touch recognition. More particularly, the touch screen panel 100 may be a self capacitive type of the capacitive types, which may measure a capacitance of one sensing electrode 120 to determine whether a touch exists and a touch position. The sensing electrodes 120 may include a transparent conductive layer such as indium tin oxide (ITO), indium zinc oxide (IZO), zinc oxide (ZnO), and indium (III) oxide ($In_2O_3$).

The pads 130 include a bonding pad connected to a printed circuit board (not illustrated) and formed on the opaque layer 105. The wirings (or routings) 140 are formed on the effective area A10 and the opaque layer 105, to connect each of the sensing electrodes 120 to corresponding pads 130. A width of the pad 130 is greater than a width of the wiring 140, and the pad 130 and the wiring 140 may be formed by the same transparent conductive layer as the sensing electrode 120.

Referring to FIG. 2, each wiring 140 is curved at a first point P1 where the substrate 110 contacts the side 106 of the opaque layer 105 and at a second point P2 where the side 106 and the upper surface of the opaque layer 105 contact each other. As such, each wiring 140 is curved two times by a step between the substrate 110 and the opaque layer 105, and line resistance of the wiring 140 is locally increased at a portion where the wiring 140 is curved.

The sensing electrodes 120 are disposed in parallel in a row direction (x-axial direction) and a column direction (y-axial direction) in the effective area A10. The wirings 140 may be formed parallel to the column direction at one side (for example, a right side based on FIG. 1) of the sensing electrodes 120 arranged in the column direction. In addition, the pads 130 may be arranged parallel to the row direction at one side (for example, a lower side based on FIG. 1) of the opaque layer 105.

The wirings 140 connected to a column of sensing electrodes 120 arranged in the column direction have different lengths along a distance between the sensing electrode 120 and the pad 130. More particularly, the wiring 140 connected to the sensing electrode 120 that is closer to the pad 130 has a smaller length. When the wirings 140 have the same width, the line resistance of the wiring 140 increases as the wiring 140 length increases.

In the touch screen panel 100, the wiring 140 that has small length may have relatively low line resistance, and may be vulnerable to static electricity. More particularly, a curved portion of the wiring 140 where the line resistance is locally increased may be vulnerable to static electricity.

When static electricity flows into the sensing electrode 120 disposed at the end furthest away from the pad 130, the static electricity may not fully move through the wiring 140 due to high line resistance of the wiring 140. However, when the static electricity flows into the sensing electrode 120 disposed at the end closest to the pad 130, the static electricity may easily move through the wiring 140 due to low line resistance of the wiring 140. In this case, since the electricity is concentrated in the wiring 140, and particularly, the electricity is concentrated at the portion where the wiring 140 is curved, the wiring may be easily damaged.

In the touch screen panel 100 according to the present exemplary embodiment, at least two wirings 140 or multiple wirings 140, which include a wiring (a shortest wiring) 141 that has the smallest length, include an extension 142 covering the side 106 of the opaque layer 105. The extension 142 may be a portion extending the width of the wiring 140 and may have the same width as the pad 130 or have a slightly smaller width than the pad 130. Referring to FIG. 3, the extension 142 according to the present exemplary embodiment is formed at all of the wirings 140.

The extension 142 suppresses the line resistance from being locally increased at the portion where the wiring 140 is curved. More particularly, when the wiring 140 including the extension 142 is curved at the first point P1 and the second point P2, the line resistance is not locally increased due to the increased width. A length L1 of the extension 142 may be greater than a length L2 of the side 106 of the opaque layer 105, and oblique portions 143 are formed at both sides of the extension 142 connected with the wiring 140, to suppress a rapid change in line resistance and concentration of the electric field.

At least one wiring 140 includes the extension 142 covering the side 106 of the opaque layer 105. Accordingly, in the touch screen panel 100 according to the present exemplary embodiment, even though the static electricity flows into the wiring 140, the static electricity is not concentrated at the portion where the wiring 140 is curved, thereby suppressing the damage to the wiring 140 due to the static electricity.

Figure 4:
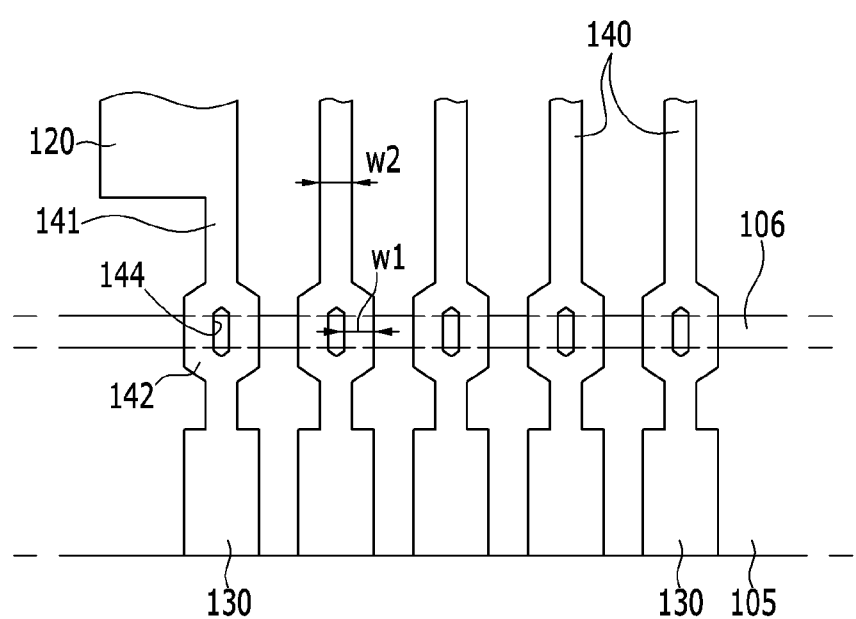
FIG. 4 is a partially enlarged view of a touch screen panel according to an exemplary embodiment of the present invention.

FIG. 4 is a partially enlarged view of a touch screen panel according to an exemplary embodiment of the present invention.

Referring to FIG. 4, the touch screen panel according to the present exemplary embodiment has the same configuration as the touch screen panel 100 illustrated with reference to FIGS. 1 to 3, except that a central slit 144 is formed at the extension 142. The same element has the same reference numeral, and hereinafter, different configurations from the touch screen panel of FIGS. 1 to 3 will be described.

The central slit 144 may include an opening region formed in the extension 142. The central slit 144 is formed parallel to a length direction of the wiring 140 at the center of the extension 142, and divides the extension 142 into two conductive paths (a left path and a right path). Accordingly, when one conductive path is disconnected by the static electricity, current may flow through the other conductive path, and as a result, the sensing electrode 120 may operate as normal.

A width W1 of the conductive path divided by the central slit 144 may be the same as a width W2 of the wiring 140, and the wiring 140 may maintain constant line resistance.

Figure 5:
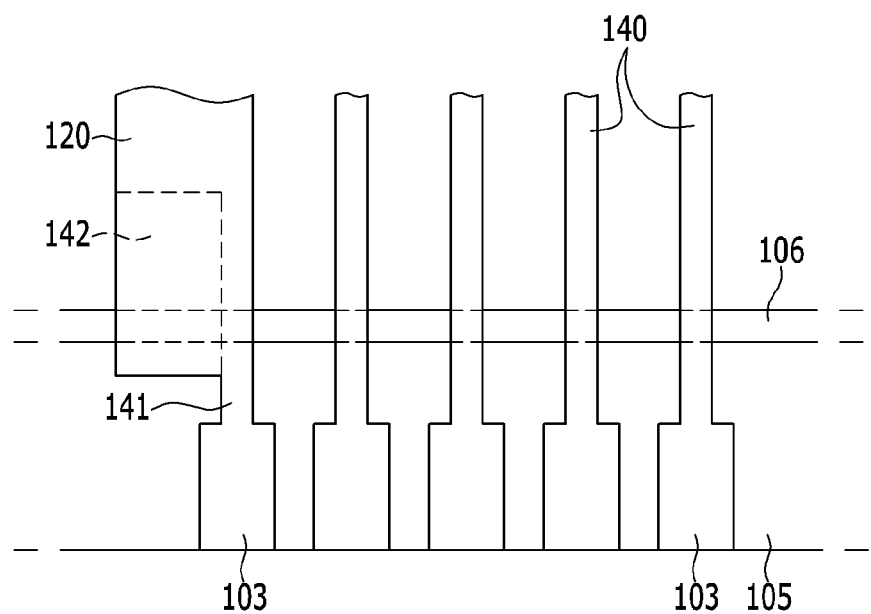
FIG. 5 is a partially enlarged view of a touch screen panel according to an exemplary embodiment of the present invention.

FIG. 5 is a partially enlarged view of a touch screen panel according to an exemplary embodiment of the present invention.

Referring to FIG. 5, the touch screen panel according to the present exemplary embodiment has a similar configuration to the touch screen panel 100 illustrated with reference to FIGS. 1 to 3, except that the shortest wiring 141 among the wirings 140 includes the extension 142. The same element has the same reference numeral, and hereinafter, different configurations from the touch screen panel 100 of FIGS. 1 to 3 will be described.

The extension 142 of the shortest wiring 141 may contact both the sensing electrode 120 and the shortest wiring 141. More particularly, the sensing electrode 120 disposed at the lowermost end of the effective area A10 among the sensing electrodes 120 is extended to the side 106 of the opaque layer 105, to include a part of the extension 142 and the shortest wiring 141. Since the shortest wiring 141 may be a portion most vulnerable to the static electricity among the wirings 140, the extension 142 may suppress the damage due to concentration of the static electricity.

Figure 6:
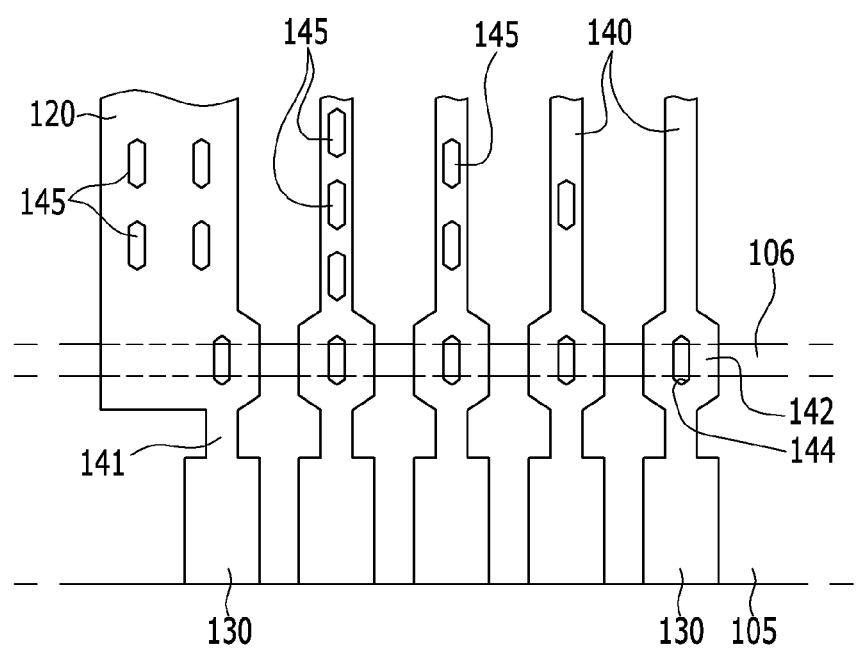
FIG. 6 is a partially enlarged view of a touch screen panel according to an exemplary embodiment of the present invention.

FIG. 6 is a partially enlarged view of a touch screen panel according to an exemplary embodiment of the present invention.

Referring to FIG. 6, the touch screen panel of the present exemplary embodiment has the same configuration as the touch screen panel illustrated with reference to FIG. 4, except that the sensing electrode 120 connected with the shortest wiring 141 extends to the side 106 of the opaque layer 105, and slits 145 are formed in at least two wirings 140 including the shortest wiring 141.

The sensing electrode 120 connected to the shortest wiring 141 is extended to the side 106 of the opaque layer 105 with the same width to suppress the damage to the shortest wiring 141 from the concentration of the static electricity. In addition, the slits 145 are formed in at least two wirings 140 including the shortest wiring 141 among the wirings 140.

In detail, a total area of the slits 145 is increased for the wiring 140 that has a shorter length, to increase the line resistance. As a result, line resistance of wirings 140 with short length, in which the static electricity may flow easily, may be increased to reduce a resistance difference between the wirings 140. Accordingly, the static electricity may not easily flow to the wirings 140 with shorter length, thereby suppressing the damage to the wiring due to the static electricity. The slit 145 may be formed in the sensing electrode 120 connected to the shortest wiring 141.

Figure 7:
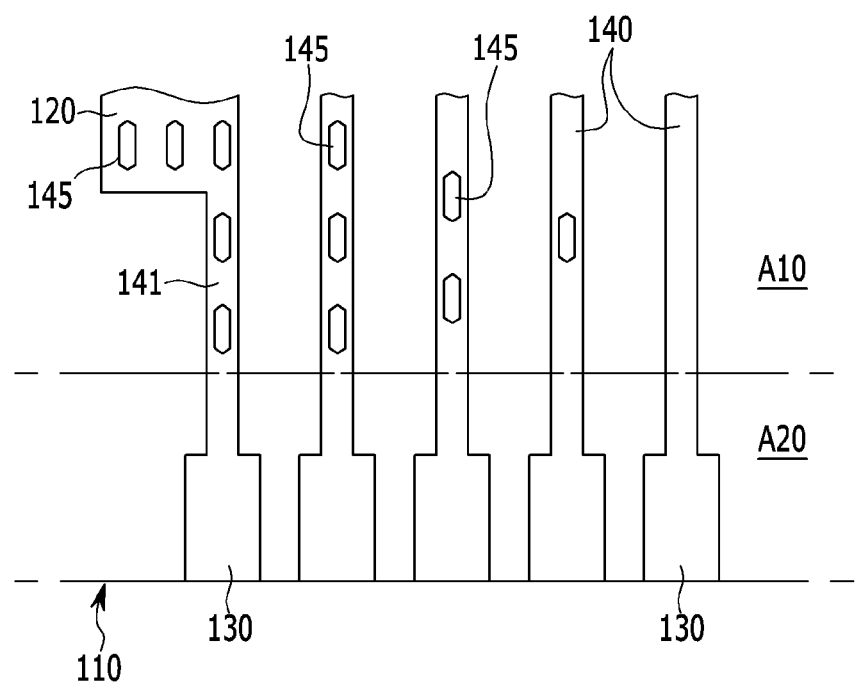
FIG. 7 is a partially enlarged view of a touch screen panel according to an exemplary embodiment of the present invention.

FIG. 7 is a partially enlarged view of a touch screen panel according to an exemplary embodiment of the present invention.

Referring to FIG. 7, in the touch screen panel according to the present exemplary embodiment, the substrate 110 may or may not include the opaque layer 105.

When the substrate 110 includes the opaque layer 105, the wirings 140 include a portion curved by a step between the substrate 110 and the opaque layer 105. When the substrate 110 does not include the opaque layer 105, the substrate 110 includes an effective area A10 and a pad area A20 outside the effective area A10, and pads 130 are formed in the pad area A20. In this case, the wirings 140 are formed in flat shape without the curved portion.

The wirings 140 connected to a column of sensing electrodes 120 arranged in the column direction may have different lengths, and the slits 145 are formed in at least two wirings 140 including the shortest wiring 141. A total area of the slits 145 is increased for the wiring 140 that has a shorter length, to increase the line resistance thereof so that the static electricity may not flow easily, thereby suppressing the damage due to the static electricity.

The slit 145 may be formed in the sensing electrode 120 connected to the shortest wiring 141. Further, at least two wirings 140 including the shortest wiring 141 may have smaller widths than other wirings 140 having relatively large lengths, so that the line resistance of the wirings 140 having smaller lengths is further increased, to prevent the static electricity from flowing easily.

Figure 8:
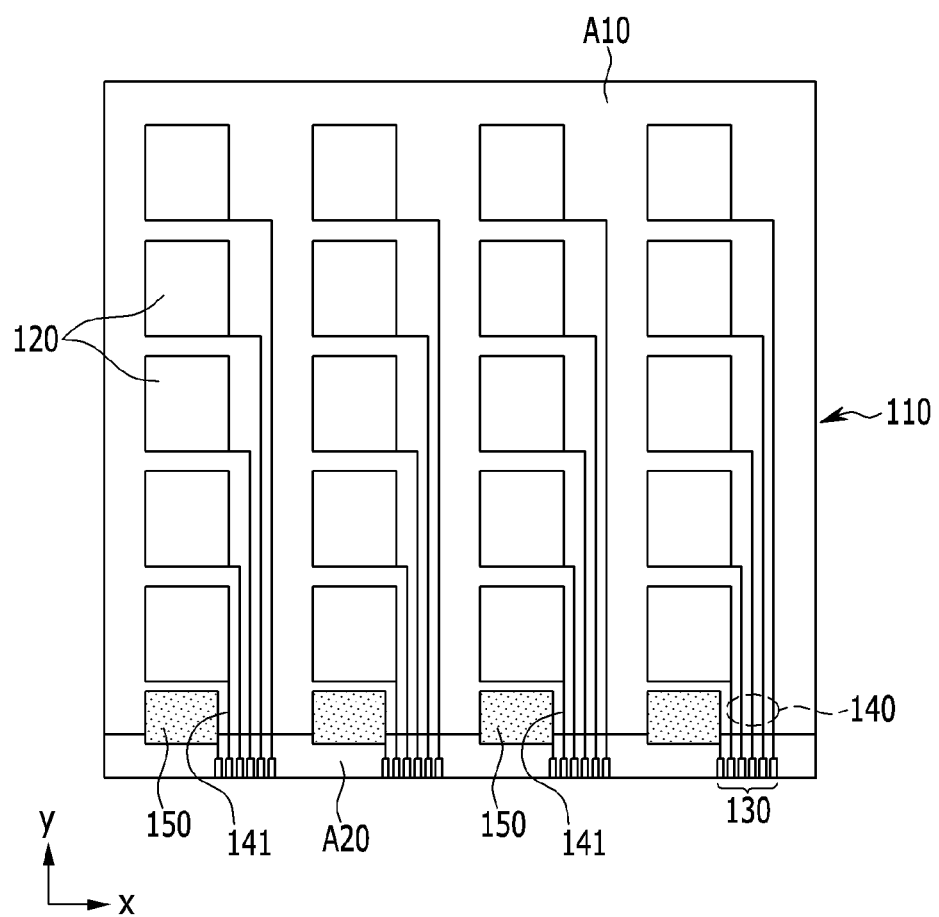
FIG. 8 is a plan view of a touch screen panel according to an exemplary embodiment of the present invention.

FIG. 8 is a plan view of a touch screen panel according to an exemplary embodiment of the present invention.

Referring to FIG. 8, the touch screen panel includes a substrate 110 including an effective area A10 and a pad area A20, sensing electrodes 120 formed in the effective area A10, pads 130 formed in the pad area A20, wirings 140 connecting the sensing electrodes 120 and the pads 130, respectively, and an electrostatic dispersion pad 150 disposed adjacent to a sensing electrode 120 that is closest to the pad area A20 among the sensing electrodes 120.

The substrate 110 may or may not include an opaque layer. When the substrate 110 includes the opaque layer, the wirings 140 include a portion curved by a step between the substrate 110 and the opaque layer. When the substrate 110 does not include the opaque layer, the wirings 140 have a flat shape without the curved portion.

The electrostatic dispersion pad 150 is adjacent to the sensing electrode 120 that is disposed closest to the pad area A20 and the shortest wiring 141 connected to the sensing electrode 120 at a predetermined distance. The electrostatic dispersion pad 150 is formed over the effective area A10 and the pad area A20, and connected to a printed circuit board and the like, to be grounded or receive DC voltage. The electrostatic dispersion pad 150 may correspond to each shortest wiring 141, and include a transparent conductive layer.

When the static electricity flows to the sensing electrode 120 closest to the pad area A20 among the sensing electrodes 120, the static electricity flows into the electrostatic dispersion pad 150 instead of the shortest wiring 141 having line resistance, and accordingly, the static electricity may be grounded or dispersed to the shortest wiring 141 and the electrostatic dispersion pad 150. Accordingly, in the touch screen panel of the present exemplary embodiment, the inflow of the static electricity to the shortest wiring 141 may be reduced or blocked, thereby suppressing the damage due to the static electricity.

Figure 9:
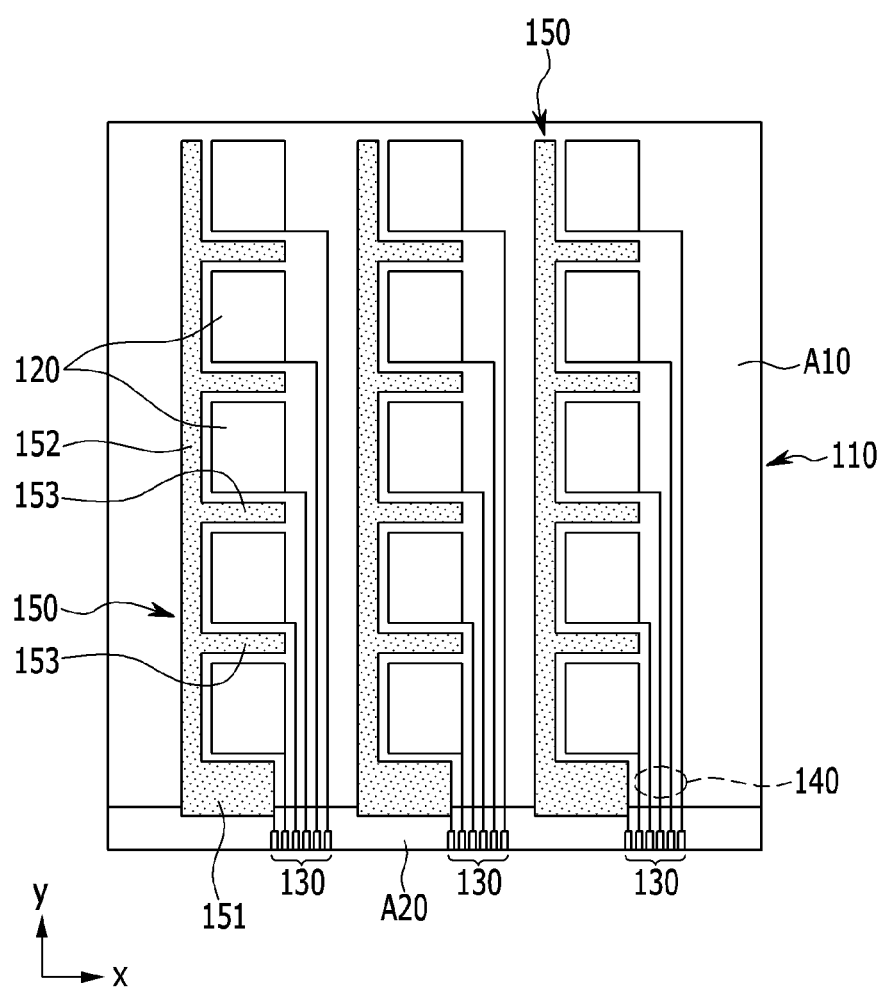
FIG. 9 is a plan view of a touch screen panel according to an exemplary embodiment of the present invention.

FIG. 9 is a plan view of a touch screen panel according to an exemplary embodiment of the present invention.

Referring to FIG. 9, the touch screen panel of the present exemplary embodiment has the same configuration as the touch screen panel illustrated with reference to FIG. 8, except that the electrostatic dispersion pad 150 is additionally formed between the sensing electrodes of the effective area A10. The same element has the same reference numeral, and hereinafter, different configurations from the touch screen panel of FIG. 8 will be mainly described.

The electrostatic dispersion pad 150 may include a first pad portion 151 formed to be adjacent to the sensing electrode 120 that is closest to the pad area A20 among the sensing electrodes 120, a second pad portion 152 connected to the first pad portion 151 and formed in parallel to the wirings 140 between the sensing electrodes 120 in the effective area A10, and third pad portions 153 connected to the second pad portion 152 and formed between a column of sensing electrodes 120, respectively.

When the wirings 140 are connected to the right side of the sensing electrodes 120, the second pad portion 152 may be formed in parallel with the wiring 140 at the left side of the sensing electrodes 120. The third pad portions 153 may be formed on each sensing electrodes 120 arranged in the column direction. The electrostatic dispersion pad 150 is grounded or receives DC voltage.

When the static electricity flows into the sensing electrode 120 among the sensing electrodes 120, the static electricity flows into the electrostatic dispersion pad 150 adjacent to the sensing electrode 120 instead of the wiring 140 that has line resistance, and the static electricity may be grounded. The electrostatic dispersion pads 150 are formed adjacent to all sensing electrodes 120 disposed in the effective area A10, such that the static electricity flowing in the effective area A10 may be quickly removed.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A touch screen panel, comprising:
a substrate comprising an effective area and an opaque layer disposed outside the effective area;
a first sensing electrode disposed in the effective area;
a first pad disposed on the opaque layer; and
a first wiring connecting the first sensing electrode to the first pad, the first wiring having a first width and longitudinally extending in a first direction, the first width is measured from a first end and a second end of the first wiring in a second direction intersecting the first direction,
wherein:
the first wiring comprises a first extension having a second width, the second width measured from a first end and a second end of the first extension in the second direction;
the second width of the first extension is greater than the first width of the first wiring; and
the first extension protrudes outwardly from the first wiring in the second direction and covers a side of the opaque layer on which the first pad is disposed.

2. The touch screen panel of claim 1, further comprising:
a second sensing electrode disposed in the effective area;
a second pad disposed on the opaque layer; and
a second wiring connecting the second sensing electrode to the second pad,
wherein:
the first wiring has a first length, the first extension has a second length, and the side of the opaque layer has a third length, the first, second, and third lengths are each measured from a third end to a fourth end thereof in the first direction;
the second wiring has a fourth length and comprises a second extension having a fifth length, the fourth length and the fifth lengths are each measured from a third end to a fourth end thereof in the first direction;
the first length of the first wiring is shorter than the fourth length of the second wiring; and
the second length of the first extension and the fifth length of the second extension are greater than the third length of the side of the opaque layer.

3. The touch screen panel of claim 2, wherein:
the first pad has a third width that is substantially the same as the second width of the first extension;
the second extension has a forth width and the second pad has a fifth width substantially the same as the fourth width,
the third, fourth, and fifth widths are each measured from a first end and a second end thereof in the second direction;
the first extension is connected to the first wiring via oblique portions disposed at each side of the first extension; and
the second extension is connected to the second wiring via oblique portions disposed at each side of the second extension.

4. The touch screen panel of claim 2, wherein:
the first extension comprises two conductive paths separated by a slit disposed therebetween;
the second extension comprises two conductive paths separated by a slit disposed therebetween; and each of the two conductive paths comprises has a sixth width that is substantially the same as the first width of the first wiring, the sixth width is measured from a first end and a second end thereof in the second direction.

5. The touch screen panel of claim 4, wherein:
the first sensing electrode contacting the first wiring extends to the side of the opaque layer; and
the first wiring and the second wiring each comprise slits.

6. The touch screen panel of claim 5, wherein:
the number of the slits disposed in the first wiring is greater than the number of the slits disposed in the second wiring.

7. The touch screen panel of claim 1, wherein:
the first extension comprises an extended portion of the first sensing electrode contacting the first wiring along the side of the opaque layer.

8. The touch screen panel of claim 1, wherein:
the substrate comprises a cover window; and
the opaque layer comprises a printed layer.

9. The touch screen panel of claim 1, wherein each of the first wiring and the first extension only has a single layer structure.

10. The touch screen panel of claim 1, wherein the first wiring and the first extension have the same number of layers.

11. The touch screen panel of claim 1, wherein the first extension overlaps both the effective area and the opaque layer.

12. The touch screen panel of claim 11, wherein:
the first extension includes a first portion overlapping the opaque layer and a second portion overlapping the effective area; and
the second portion of the first extension does not overlap the opaque layer.

13. The touch screen panel of claim 12, wherein a first distance which is a shortest distance between the first portion of the first extension and the substrate is greater than a second distance which is a shortest distance between the second portion of the first extension and the substrate.

14. A touch screen panel, comprising:
a substrate comprising an effective area and a pad area;
a first sensing electrode and a second sensing electrode disposed in the effective area;
a first pad and a second pad disposed in the pad area;
a first wiring connecting the first sensing electrode and the first pad, the first wiring longitudinally extending in a first direction and having a first length; and
a second wiring connecting the second sensing electrode and the second pad, the second wiring having a second length greater than the first length,
wherein:
the first length is measured from a first end to a second end of the first wiring in the first direction, and the second length is measured from a first end to a second end of the second wiring in the first direction;
the first wiring and the second wiring each comprise slits; and
the number of the slits disposed in the first wiring is greater than the number of the slits disposed in the second wiring.

15. The touch screen panel of claim 14, wherein:
the substrate further comprises an opaque layer disposed outside the effective area; and
the first pad and the second pad are disposed on the opaque layer.

16. The touch screen panel of claim 14, wherein each of the first wiring and the second wiring only has a single layer structure.

* * * * *